United States Patent
Gibbens et al.

(10) Patent No.: US 7,413,660 B2
(45) Date of Patent: Aug. 19, 2008

(54) SINGLE PASS METHOD AND APPARATUS FOR SEPARATING A TARGET MOLECULE FROM A LIQUID MIXTURE

(75) Inventors: Kelly J. Gibbens, Vadnais Heights, MN (US); Masayuki Nakamura, Woodbury, MN (US); Kannan Seshadri, Woodbury, MN (US); Andrew W. Rabins, St. Paul, MN (US); Larry J. Carson, Maplewood, MN (US); Robert T. Fitzsimons, Jr., Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 474 days.

(21) Appl. No.: 11/241,524

(22) Filed: Sep. 30, 2005

(65) Prior Publication Data
US 2007/0075022 A1 Apr. 5, 2007

(51) Int. Cl.
*B01D 15/08* (2006.01)
(52) U.S. Cl. ................................... 210/659; 210/198.2
(58) Field of Classification Search ................ 210/635, 210/656, 659, 670, 672, 198.2, 232, 234, 210/269
See application file for complete search history.

(56) References Cited

U.S. PATENT DOCUMENTS

| | | | |
|---|---|---|---|
| 2,985,589 A | 5/1961 | Broughton et al. | |
| 4,599,115 A | 7/1986 | Ando et al. | |
| 4,851,573 A | 7/1989 | Kulprathipanja et al. | |
| 4,990,259 A * | 2/1991 | Kearney et al. | 210/659 |
| 5,468,847 A | 11/1995 | Heilmann et al. | |
| 5,770,088 A | 6/1998 | Ikeda et al. | |
| 6,325,940 B1 * | 12/2001 | Ikeda | 210/659 |
| 6,576,137 B1 * | 6/2003 | Ma | 210/657 |
| 7,141,172 B2 * | 11/2006 | Wang et al. | 210/659 |
| 7,288,200 B1 * | 10/2007 | Hotier et al. | 210/659 |
| 2001/0030158 A1 * | 10/2001 | Tanimura et al. | 210/656 |
| 2002/0088754 A1 * | 7/2002 | Tanimura et al. | 210/656 |
| 2005/0000879 A1 | 1/2005 | Kearney et al. | |
| 2006/0070955 A1 | 4/2006 | Rabins | |

FOREIGN PATENT DOCUMENTS

| | | |
|---|---|---|
| EP | 0 879 634 | 11/1998 |
| EP | 1336610 | 8/2003 |
| WO | WO 2004/024284 | 3/2004 |

OTHER PUBLICATIONS

"Simulated Moving Bed-Verfahren", Georg Thieme Verlag, XP002419747, p. 1, Mar. 2002.

* cited by examiner

*Primary Examiner*—Ernest G Therkorn
(74) *Attorney, Agent, or Firm*—Jean A. Lown

(57) ABSTRACT

A single pass simulated moving bed apparatus and methods are described for continuously separating a target molecule from a liquid mixture, using a simulated moving bed system. The simulated moving bed system includes a plurality of filter cartridge modules in serial fluid communication. Each filter cartridge module includes a volume of stationary phase particulates adjacent a porous substrate layer. The volume of stationary phase particulates has a bed height of less than 1 centimeter.

13 Claims, 3 Drawing Sheets

SINGLE PASS METHOD AND APPARATUS FOR SEPARATING A TARGET MOLECULE FROM A LIQUID MIXTURE

BACKGROUND

The present invention relates to methods and apparatus for separating a target molecule from a liquid mixture using a simulated moving bed including a plurality of cartridge filter modules.

Target molecules such as, for example, biomacromolecules are constituents or products of living cells and include, for example, proteins, carbohydrates, lipids, and nucleic acids. Detection and quantification as well as isolation and purification of these materials have long been objectives of investigators. Detection and quantification are important diagnostically, for example, as indicators of various physiological conditions such as diseases. Isolation and purification of biomacromolecules are important for therapeutic purposes such as when administered to patients having a deficiency in the particular biomacromolecule or when utilized as a biocompatible carrier of some medicament, and in biomedical research. Biomacromolecules such as enzymes which are a special class of proteins capable of catalyzing chemical reactions are also useful industrially; enzymes have been isolated, purified, and then utilized for the production of sweeteners, antibiotics, and a variety of organic compounds such as ethanol, acetic acid, lysine, aspartic acid, and biologically useful products such as antibodies and steroids.

In their native state in vivo, structures and corresponding biological activities of these biomacromolecules are maintained generally within fairly narrow ranges of pH and ionic strength. Consequently, any separation and purification operation must take such factors into account in order for the resultant, processed biomacromolecule to have potency.

Chromatography is a separation and purification operation that can be performed on biological product mixtures. It is a technique based on the interchange of a solute between a moving phase, which can be a gas or liquid, and a stationary phase. Separation of various solutes of the solution mixture is accomplished because of varying binding interactions of each solute with the stationary phase; stronger binding interactions generally result in longer retention times when subjected to the dissociation or displacement effects of a mobile phase compared to solutes which interact less strongly and, in this fashion, separation and purification can be effected.

Most current capture or purification chromatography is done via conventional column techniques. These techniques have severe bottlenecking issues in downstream purification, as the throughput using this technology is low. Attempts to alleviate these issues include increasing the diameter of the chromatography column, but this in turn creates challenges due to difficulties of packing the columns effectively and reproducibly. Larger column diameters also increase the occurrence of problematic channeling. Also, in a conventional chromatographic column, the absorption operation is shut down when a breakthrough of the desired product above a specific level is detected. This causes the dynamic or effective capacity of the adsorption media to be significantly less than the overall or static capacity. This reduction in effectiveness has severe economic consequences, given the high cost of some chromatographic resins.

SUMMARY

Generally, the present invention relates to a simulated moving bed apparatus and methods for continuously separating a target molecule from a solution mixture, using a simulated moving bed system. The simulated moving bed apparatus includes a plurality of filter cartridge modules in serial fluid communication. Each filter cartridge module includes a volume of stationary phase particulates adjacent a porous substrate layer. The volume of stationary phase particulates has a bed height less than 1 centimeter.

In one embodiment, a single pass method of continuously separating a target molecule from a solution mixture includes providing a simulated moving bed apparatus including a plurality of filter cartridge modules, flowing a solution mixture including a target molecule continuously through the plurality of filter cartridge modules, binding the target molecule to the volume of stationary phase particulates to form a target molecule:stationary phase particulate product, removing a loaded filter cartridge module containing the target molecule:stationary phase particulate product from the solution mixture flow, separating the target molecule from the target molecule:stationary phase particulate product in the loaded filter cartridge to form a isolated target molecule product and a regenerated filter cartridge, and adding the regenerated filter cartridge module to the solution mixture flow. Each filter cartridge module includes a volume of stationary phase particulates adjacent a porous substrate layer, a filter cartridge module inlet, and a filter cartridge module outlet. The volume of stationary phase particulates has a bed height less than 1 centimeter. The plurality of filter cartridge modules are in serial fluid connection.

In another embodiment, a single pass simulated moving bed apparatus for continuously separating a target molecule from a solution mixture includes a capture zone and a recovery zone. The capture zone includes a plurality of filter cartridge modules connected in series, including a first loaded filter cartridge module and a final regenerated filter cartridge module. The first loaded filter cartridge module is connected to a solution mixture feed source and the final regenerated filter cartridge module is connected to a target molecule depleted solution mixture vessel. Each filter cartridge module includes a volume of stationary phase particulates capable of binding with a target molecule adjacent a porous substrate layer, a filter cartridge module inlet, and a filter cartridge module outlet. The volume of stationary phase particulates has a bed height less than 1 centimeter. The filter cartridge module outlet is also connected to a filter cartridge module inlet of a subsequent downstream filter cartridge module. The recovery zone is where the target molecule in a loaded filter cartridge module is separated from the volume of stationary phase particulates to form a regenerated filter cartridge module. The recovery zone includes at least one filter cartridge module.

The above summary of the present invention is not intended to describe each disclosed embodiment or every implementation of the present invention. The Figures, Detailed Description and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
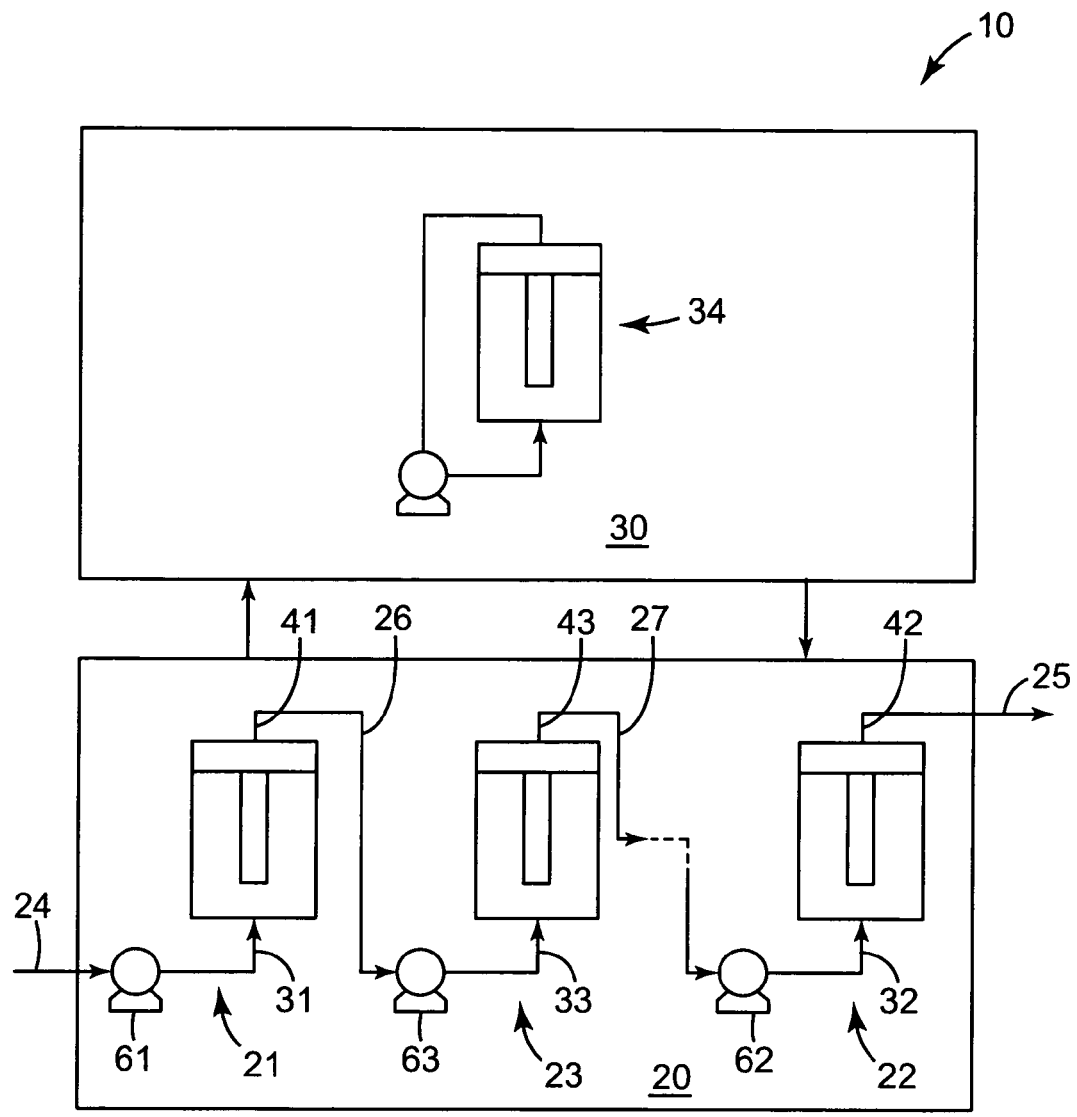
FIG. 1 is a schematic illustrative diagram of a single pass simulated moving bed.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

The term "filtration layer" or "porous substrate layer" refers to a sheet-like woven or nonwoven porous material which can comprise one or more individual layers which can be combined to provide a single sheet; the average pore size can be greater than 1 micrometer and up to 50 micrometers.

The term "composite filtration medium" refers to a filtration layer comprising a layer of stationary phase particulates located on the upstream surface thereof; the medium can sustain a flux rate of at least 0.01 cm/min at a filter cartridge pressure of at most 0.25 MegaPascals (MPa).

The term "filter element" or "filtering element" or "filtration element" refers to a composite filtration medium configured for fluid passage.

The term "filter cartridge" refers to a dead end filtering device which is preferably cylindrical in shape.

The term "filter cartridge housing" refers to a support structure for a filter cartridge.

The term "separation filter assembly" refers to a housing containing a dead end filter cartridge comprising a composite filter medium on the upstream surface of which are located stationary phase particulates.

The term "dead end filter" or "dead end filtering device" refers to a filtering element in which 100% of the fluid goes through the filter.

The term "flux rate" refers to the velocity of a liquid stream passing through a filtering element and is equal to flow rate divided by the surface area of the filtration layer. Described in this way, flow of a liquid stream can be characterized and is independent of the size of the filtration layer. Flux rate also contributes to pressure drop across a filter, i.e., increased flux rates generally mean increased system pressures. In commercial filter cartridge applications, it may be desirable to provide a filter of minimum size which will process a maximum amount of liquid stream. Therefore, it is desirable that flux rate be increased by increasing the flow rate.

The term "stationary phase particulates" refers to insoluble particulates that can form a binding association with a target molecule of interest in a solution mixture. Specific binding associations can include: adsorption, ion exchange, hydrophobic, and affinity interactions.

The term "target molecule" refers to one or more chemical species for which the simulated moving bed apparatus described herein is designed to separate from a liquid feed stream or solution mixture feed stream. Target molecules can include, for example, pharmaceutical species; biomacromolecules such as, proteins and antibodies (monoclonal or polyclonal), DNA, and RNA, expressed by bacterial, yeast, mammalian, plant, or insect cells; minerals; and manmade chemical species such as, for example, synthetic small organic molecules, peptides and polypeptides, oligosaccharides, and sugar modified proteins. In some embodiments, the target molecule can be one or more impurities or waste products, including proteins; inorganic species such as metals, metal ions, or ions such as carbonates, sulfates, oxides, phosphates, bicarbonates, and other ions commonly found in industrial, residential and biological feed streams; small organic molecules such as those that comprise, but are not limited to, dyes, pesticides, fertilizers, additives, and stabilizers; process byproducts and pollutants; DNA, RNA, phospholipids, viruses, or other cell debris from a bioprocess. In still a further embodiment, leached ligands such as, for example, protein A from an upstream affinity separation process could also be a target molecule. In other embodiments, the simulated moving bed apparatus described herein could be used to remove various chemical or biological species from a waste or drinking water stream, either via adsorption or enzymatic reaction, for example.

The term "insoluble" refers to not more than 1 part solid dissolved in 100 parts of solvent at 23 degree Celsius.

The term "filter cartridge differential pressure" refers to the difference between inlet, or upstream, and outlet, or downstream, pressures across the filter cartridge unit in a separation system.

The term "bed height" is defined as the volume of stationary phase particulate divided by the porous substrate surface area.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Simulated moving bed chromatography is a relatively recent technology where a series of packed columns are indexed or rotated (physically or with valving) through a system feeding a solution with a desired product or target molecule. As the packed columns are saturated, the system is indexed moving the saturated column to a recovery zone where it is washed, eluted, optionally cleaned, and re-equilibrated. An equilibrated column is then placed on-line at the end of the column series. With conventional column chromatography, users are faced with two constraints, low throughput, and poor usage of chromatography resin due to dynamic breakthrough concerns.

In some embodiments, the simulated moving bed (SMB) system described herein is suitable for separating antibodies, immunoreactive compounds, or other proteins from a clarified fermentation broth stream, to name a few. It is intended for use as an isolation (e.g. volume reduction) and purification step. The fermentation broth can be passed through the SMB system after it has been clarified. This means that the cells, support, and cell debris has been at least mostly removed by a separation process such as centrifugation, dead end microfiltration, or tangential flow microfiltration, for example.

FIG. 1 is a schematic illustrative diagram of a single pass simulated moving bed 10. The simulated moving bed 10 includes a capture zone 20 and a recovery zone 30. The capture zone 20 includes a plurality of filter cartridge modules, including, for example, a first filter cartridge module 21, a final filter cartridge module 22 and an optional intermediate filter cartridge module 23. In some embodiments, the plurality of filter cartridge modules are each "dead end" filtering devices. A simulated moving bed 10 is a "single pass" system where the solution mixture moves through each filter cartridge module a single time and solution mixture is not recirculated. Thus, the amount of material flowing through each filter cartridge module is substantially the same as the system inlet flow and system outlet flow.

These filter cartridges are connected in series and in fluid connection (serial fluid connection) via feed forward lines 26 and 27, for example. Each filter cartridge module contains a volume of stationary phase particulates capable of binding with a target molecule. The filter cartridge modules are described in greater detail below. In operation, the first filter cartridge module 21 can be termed the "loaded" filter cartridge module and refers to the filter cartridge module that contains a highest level of target molecule captured on the solid phase. The first filter cartridge module 21 is connected to a feed source 24.

The recovery zone 30 includes at least one filter cartridge module 34 that is initially termed a saturated or "loaded" filter cartridge module that has been moved out of the capture zone 20 either physically or by valving. The recovery zone 30 regenerates the filter cartridge module 34 to form a regenerated filter cartridge module. The term "regenerated filter cartridge module" refers to a filter cartridge module that has been washed, eluted, optionally cleaned, and re-equilibrated. The wash step removes the solution mixture from the loaded filter cartridge module. The elution step removes the target molecule from the stationary phase for further processing, if desired. The cleaning step removes impurities or trace contaminants from the filter cartridge module. Re-equilibration can involve a buffer exchange to allow the regenerated filter cartridge module to be reintroduced into the capture zone. In some embodiments, at least a portion of liquids from the recovery zone 30 can be introduced into the feed source stream 24, as desired.

The regenerated filter cartridge module can be moved back into the capture zone 20, either physically or with manifolds and valving. The regenerated filter cartridge module can be placed as the final filter cartridge module 22. The filter cartridge modules (solid phase) can thus be indexed countercurrent to the solution mixture flow.

The capture zone 20 can include 0, 1, 2, 3, 4, 5, 6, 7, or 8 or more intermediate filter cartridge modules 23 in serial fluid connection. The recovery zone 30 can include 0, 1, 2, 3, 4 or more filter cartridge modules. The recovery zone includes 0 modules if, for example, the cartridge is used for contamination removal and the cartridge is disposable.

The first or "loaded" filter cartridge module 21 includes a fluid inlet 31 and a fluid outlet 41. Optional pump 61 is in fluid connection with the fluid inlet 31 and the feed source 24. The pump 61 can provide adequate fluid flow through the filter cartridge module 21. The fluid outlet 41 allows the fluid flow to flow forward to the next filter cartridge module (23 in FIG. 1) in series. In many embodiments, the solution mixture feed flow rate is the same as or substantially the same as the solution mixture flow rate through the first filter cartridge module 21.

The final or "regenerated" filter cartridge module 22 includes a fluid inlet 32 and a fluid outlet 42. Optional pump 62 is in fluid connection with the fluid inlet 32 and the fluid outlet 43 from a previous filter cartridge module in series. The pump 62 can provide adequate fluid flow through the filter cartridge module 22. The fluid outlet 42 is shown in fluid connection with a target molecule depleted solution mixture stream line 25. This target molecule depleted solution mixture stream line 25 can be in fluid connection with a target molecule depleted solution mixture vessel (not shown.). In many embodiments, the depleted solution mixture flow rate is the same as or substantially the same as the solution mixture flow rate through the final filter cartridge module 22.

The optional intermediate filter cartridge module 23 includes a fluid inlet 33 and a fluid outlet 43. Optional pump 63 is in fluid connection with the fluid inlet 33 and the fluid outlet 41 from a previous filter cartridge module in series. The pump 63 can provide adequate fluid flow through the filter cartridge module 23. In many embodiments, the solution mixture feed flow rate is the same as or substantially the same as the solution mixture flow rate through the intermediate filter cartridge module 23.

In one embodiment, a single pass method of continuously separating a target molecule from a solution mixture includes providing a simulated moving bed apparatus including a plurality of filter cartridge modules, flowing a solution mixture including a target molecule continuously through the plurality of filter cartridge modules, binding the target molecule to the volume of stationary phase particulates to form a target molecule:stationary phase particulate product, removing a loaded filter cartridge module containing the target molecule:stationary phase particulate product from the solution mixture flow, separating the target molecule from the target molecule:stationary phase particulate product from the loaded filter cartridge to form an isolated target molecule product and a regenerated filter cartridge, and adding the regenerated filter cartridge module to the solution mixture flow. Each filter cartridge module includes a volume of stationary phase particulates adjacent a porous substrate (i.e., filtration) layer, a filter cartridge module inlet, and a filter cartridge module outlet. In some embodiments, the volume of stationary phase particulates has a bed height of less than 1 centimeter. In other embodiments the bed height is in a range from of 0.02 to 0.20 centimeters or 0.02 to 0.14 centimeters. The plurality of filter cartridge modules are in serial fluid connection.

In one illustrative embodiment, the removing step and the adding step occur simultaneously. In another illustrative embodiment, the removing step, the flowing step, and the adding step occur simultaneously. In another illustrative embodiment, the separating step and the binding step occur simultaneously. In still another illustrative embodiment, the removing step, the separating step, the flowing step, the binding step, and the adding step occur simultaneously.

While one pump is shown associated with one filter cartridge module, it is understood that more than one pump can be associated with each filter cartridge module. In addition, it is also understood that more than one filter cartridge module can be associated with each pump. In some embodiments no pump may be used.

Each filter cartridge module in the capture zone has a solution mixture flowing through it at a specified rate defined as liters/minute of solution mixture per liter of stationary phase particulate in the filter cartridge module. This flow rate can be any useful value. In some embodiments, this flow rate is less than 3 liter/minute per liter of stationary phase particulate, in other embodiments this flow rate is at least 3 liter/minute per liter of stationary phase particulate, or at least 5 liter/minute per liter of stationary phase particulate, or at least 7 liter/minute per liter of stationary phase particulate, or from 3 to 20 liter/minute per liter, or from 5 to 20 liter/minute per liter, or from 7 to 20 liter/minute per liter.

Each filter cartridge module in the capture zone has a solution mixture pressure drop or differential pressure across the filter cartridge inlet and the filter cartridge outlet. In some embodiments, this pressure drop is 172 kPa (25 psi) or less, 138 kPa (20 psi) or less, 103 kPa (15 psi) or less, 69 kPa (10 psi) or less, or 34 kPa (5 psi) or less. In an illustrative embodiment, the filter cartridge module has a flow rate of at least 7 liter/minute per liter of stationary phase particulate (mean diameter from 5 to 30 micrometers) with a pressure drop of 103 kPa (15 psi) or less. In another illustrative embodiment, the filter cartridge module has a flow rate of at least 5 liter/minute per liter of stationary phase particulate (mean diameter from 5 to 30 micrometers) with a pressure drop of 69 kPa (10 psi) or less. In a further illustrative embodiment, the filter cartridge module has a flow rate of at least 3 liter/minute per liter of stationary phase particulate (mean diameter from 5 to 30 micrometers) with a pressure drop of 34 kPa (5 psi) or less.

The filter cartridge modules described herein differ from conventional chromatography packed columns in at least several respects. Rather than a tube filled with media operated at a low flow rate, the filter cartridge modules depend on a relatively thin layer of media supported on a porous membrane operated at a high flow rate. This allows for a lower pressure drop, better external mass transfer, as well as the use of smaller media particles than can be employed with traditional chromatography packed columns.

In many embodiments, the filter cartridge module has a stationary phase particulate bed height (volume of stationary phase particulate divided by the porous substrate surface area) of less than 1 centimeter, or in a range from 0.02 to 0.20 centimeters or 0.02 to 0.14 centimeters or from 0.04 to 0.10 centimeters, or from 0.05 to 0.08 centimeters, as desired. In illustrative embodiments, the porous substrate surface area is in a range from 100,000 to 200,000 square centimeters.

In one illustrative embodiment, the filter cartridge has a height of one meter with 15 liters of protein A beads, having a mean diameter from 5 to 30 micrometers and a bed height from 0.04 to 0.10 centimeters, supported on the porous substrate.

Figure 2:
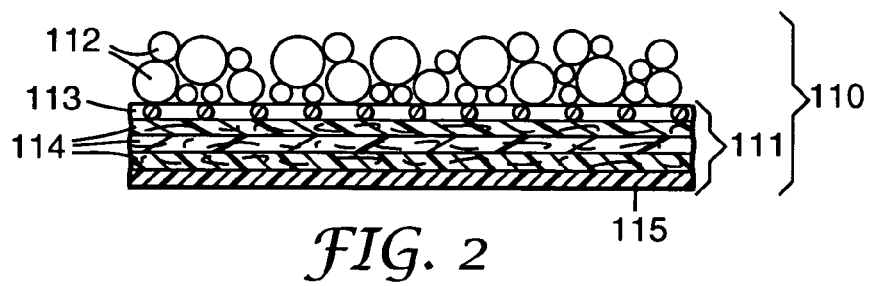
FIG. 2 is a schematic illustration of a cross-section of a composite filtration medium.

FIG. 2 is a schematic illustration of a cross-section of a composite filtration medium 110 including an illustrative nonwoven web as a surface filtration layer 111 which can be one or more individual layers, upon the upstream surface of which are located insoluble stationary phase particulates 112. The filtration layer 110 can include an upstream pre-filter layer 113, filtration layers 114 that can include a plurality of filtration layers having increasingly finer downstream porosity, and a downstream cover layer 115.

Figure 3:
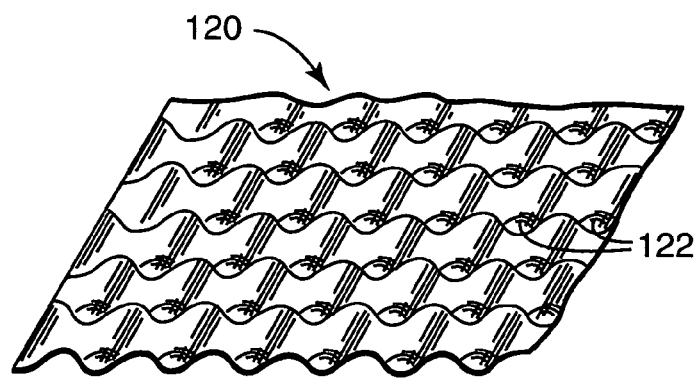
FIG. 3 is a perspective view of an illustrative composite filtration medium.

FIG. 3 is a perspective view of a nonpleated portion of a pattern of embossed shapes 122 on composite filtration medium 120 utilized to produce an illustrative embodiment of the filter cartridge module. Embossing can be conducted to increase surface area and more completely define the surface filtering element. The insoluble stationary phase particulates are omitted from the illustration for clarity.

Figure 4:
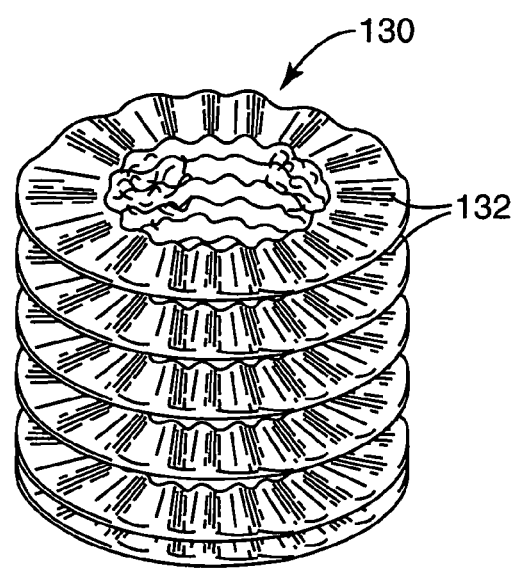
FIG. 4 is a perspective view of an illustrative cylindrically pleated filter element.

FIG. 4 is a perspective view of an illustrative embodiment of one longitudinally extended cylindrically pleated filter element 130. Radial pleats 132 of composite filtration (porous substrate) element 130 are shown, and stationary phase particulates 112 are omitted for clarity. In some embodiments, the composite filtration element 130 includes 10 or more, 20 or more, 30 or more, 40 or more, or 50 or more pleats 132.

Figure 5:
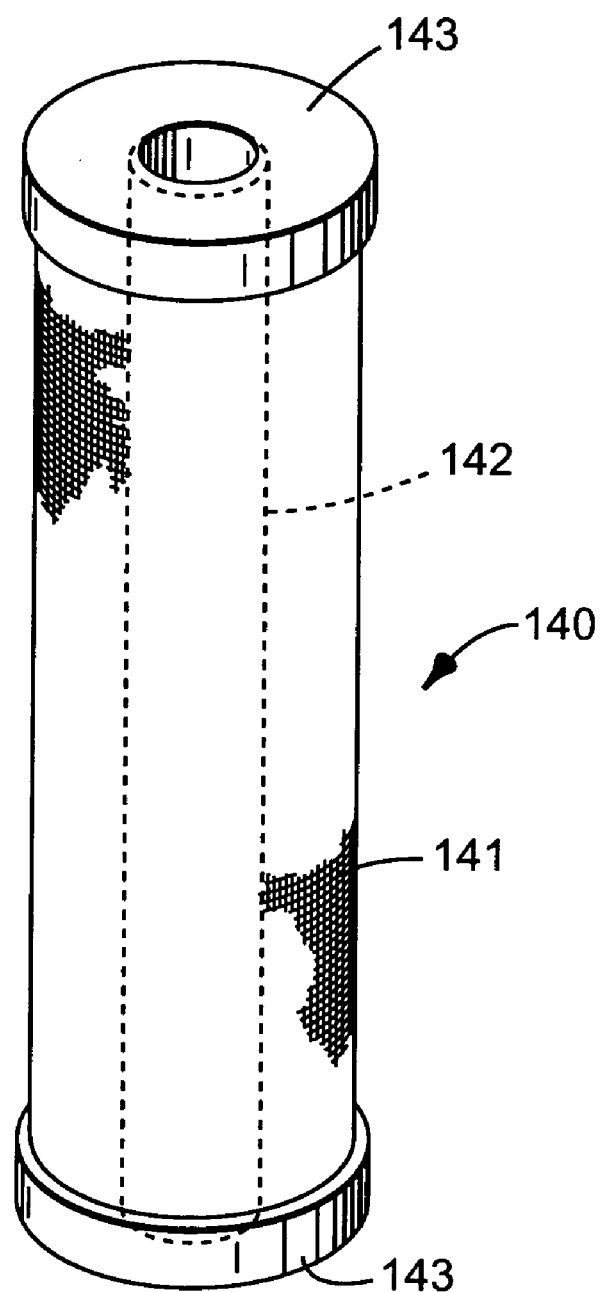
FIG. 5 is a perspective view of a cylindrical filter cartridge.

FIG. 5 is a perspective view which illustrates one embodiment of inner and outer supplemental support members for the composite filtration element 130 (not shown) within a cylindrical filter cartridge 140. External support structure 141, such as a scrim or screen with a plurality of holes, can provide additional support in an inward-out fluid flow mode to reduce the likelihood of rupturing the filter element. Similarly, inner support structure 142 consisting of a scrim or screen, or a porous casing or similar construction can provide support to prevent the filter element 130 (not shown) from collapsing under high pressure applications in an outward-in fluid flow situation. In both cases, the supplemental support structures can be attached to endpieces 143 of the filter cartridge to provide an integral unit. One example of a useful filter cartridge module is described in U.S. Pat. No. 5,468,847, and is incorporated by reference herein.

Referring to FIG. 2, the stationary phase particulates 112 bind or strongly associate with the target molecule of interest in solution mixtures by one or a combination of the following interactions: adsorption, ion exchange, hydrophobic association, size exclusion, and/or affinity binding.

A partial listing of adsorption stationary phase particulates include: hydroxyapatite (available from BioRad Laboratories, Richmond, Calif.), alumina (available from EM separations, Gibbstown, N.J.), silicagel (available from EM Separations), silica (available from Celite), zirconia (disclosed in U.S. Pat. No. 5,015,373, incorporated by reference herein), zeolites, montmorillonite clays, titania, zinc hydroxide, and polymer coated zirconia.

A partial listing of ion exchange stationary phase particulates are commercially available, for example, from Amersham, Toso Haas, EM Separations, J T Baker, and Ciphergen. Suitable ion exchange resins include: agarose, dextran, polyacrylic, polyimine, vinyl polymers, acrylamide polymers, polysaccharides, cellulosic polymers, and other polymers such as polystyrene modified with divinylbenzene, acrylate/ethylene glycol co-polymers, respectively modified to contain diaminoethyl, quaternary ammonium groups in case of anion exchange and carboxymethyl, sulfo and sulfopropyl groups for cation exchange. Other supports for ion exchange resins include silica, both neat and stabilized with inorganic species such as zirconia. Mixed function adsorbents include, for example dipolar ion exchange adsorbents (sulfanilic acid coupled to epoxy activated agarose). Polyethyleneimine can be used to purify nucleic acids, and precipitates nucleoproteins. Hydrophobic interaction particulates can contain short aliphatic chain ($C_4$-$C_{10}$) and phenyl groups, while reverse phase adsorbents containing longer aliphatic chains ($C_8$-$C_{18}$), can be used for smaller proteins. Reverse phase chromatography supports include those based on silica coupled with organosilanes, titania, poly(styrene-divinylbenzene), aluminum oxide, etc.

A partial listing of size exclusion particulates include: porous glass, silica based supports modified by diols, diol-bonded silica subsequently modified by metal oxides such as zirconia, polymer based particles containing crosslinked agarose and dextran, or both; allyl dextran crosslinked with methylene bis-acrylamide, polymers synthesized as tentacle polymers (Fractogel from Merck), cellulose, polyhydroxymethacrylate, crosslinked polysaccharides, and copolymerized acrylates.

Affinity chromatography particulates are commercially available from Amersham, Millipore, Tosoh, EM Separations, Ciphergen, and Applied Biosystems, among others. The base supports can include agarose, cellulose and vinyl polymers. Some particulates may also contain inorganic supports in the core such as silica (ProSep from Millipore) and stainless steel (Streamline from Amersham), or composites (such as ceramic and acrylic from BioSepra). The base supports can be modified or provided with groups that can be used to immobilize ligands. These groups include azlactone, CNBr, epoxy, hydrazides, NHS, tresyl, thiophilic groups, and hydroxyapatite. The ligands (with specific biomacromolecule affinities) can be chosen from a wide-ranging list including: arginine and benzamidine (serine proteases); calmodulin (ATPases, protein kinases, phosphodiesterases, and neurotransmitters); gelatin (fibronectins); glutathione (transferases, glutathione dependent proteins, and fusion proteins); heparin (growth factors, coagulation proteins, steroid receptors, restriction endonucleases, lipoproteins, and lipases); Proteins A and G (IgG and subclasses); Protein A mimetic synthetic ligands (IgG, IgM, and other immunoglobulins); L-lysine (plasminogen, plasminogen activator, and ribosomal RNA); concanavalin A and lectins (glycoproteins, membrane proteins, glycolipids, and polysaccharides); DNA (DNA polymerase, RNA polymerase, T-4 polynucleotide kinase, and exonucleases); and AMP, ADP, NADH and NADPH based chromatography (enzymes such as NADH- and NADPH-dependent dehydrogenases, reductases, kinases, phosphatases, and transferases).

Other affinity methods include those without a biospecific interaction, such as immobilized metals such as Fe, Co, Ni, Cu, Al and Zn that form the basis of IMAC (immobilized metal affinity chromatography) wherein the purification is by the formation of coordinate bonds. Other affinity matrices use thiophilic ligands such as vinyl sulfone linked mercaptoethanol, pyridyl disulfide linkages, etc., that have affinity for γ-globulins and monoclonal antibodies.

Affinity matrices can also be utilized for separation of cells (cell affinity chromatography or CAC). Matrices for CAC include agarose, cellulose, dextran, polyacrylamide, glass, polystyrene, trisacryl (modified so as to have reactive groups such as —OH, —OCN, —CH—CH$_2$O, —NH$_2$, to couple specific proteins such as avidin, IgG, anti-IgG, anti-IgE, etc. to capture specific cell types such as lymphocytes, stem cells, neuronal cells, mast cells, basophils, erythrocytes, etc.). Other variations include the use of a tentacle approach to couple ligands to grafted polymer chains (such as Fractogel from Merck, which is a polyglycidylmethacrylate grafted gel); the ligands could be from any of those described above, and could be coupled either directly (for thiophilic adsorption/IMAC) or indirectly (for dye-ligand affinity chromatography through amino intermediates, or immobilized proteins via azlactone intermediates)

Particulates for ultrafiltration and concentration such as Sephadex G-25 (commercially available from Pharmacia), polyethylene glycol, or carboxymethyl cellulose can also be used. These materials may be loaded into the cartridge filter module in a slurry form, which may be made from the particulates as received, or may require preswelling in some solvents or buffers, or may have to be pretreated.

The sizes of the stationary phase particulates useful in the invention can have a mean diameter that ranges from 1 to 200 micrometers, or 3 to 50 micrometers, or 5 to 40 micrometers, or 5 to 30 micrometers, or 5 to 15 micrometers. Illustrative stationary phase particulates include, for example, ProSep-A™ Ultra resin, commercially available from Millipore Inc., (Billerica, Mass.), and MabSelect™ resin, commercially available from GE Healthcare (Chalfont St. Giles, UK). In some embodiments, each filter cartridge module includes 5 to 25 liters of stationary phase particulates, or 10 to 20 liters of stationary phase particulates.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

This example includes four modules in series in the capture sequence, and three modules in the recovery zone. This system was used to remove IgG from a feed solution, containing polyclonal human IgG from EQUITECH-BIO, Inc.; Kerrville, Tex. in PBS buffer (10 mM Na-Phosphate, 0.9% NaCl, pH 7.4), by Protein A affinity separation. A module was composed of a filter capsule manufactured by Pall (Part Number 12121), and a stationary phase of 13 mL of a Protein A Biosupport Medium (prepared according to U.S. Pat. No. 5,907,016 Example 4) having a mean particle diameter of 28 micrometers. The bed height was 0.04 cm. Corresponding to each module, there was an inlet stream and an outlet stream. The outlet stream was the feed for the next module. The liquid volume of the module and piping was estimated to be 112 mL. Four modules were connected in series for the capture zone. The feed stream was the inlet to the first module. The outlet from the fourth module was the waste, or effluent, stream. The overall process includes capture, wash, elution, optional cleaning and re-equilibration. The cleaning step was used after the final elution for the batch, otherwise the module is re-equilibrated and placed back into the capture train. At the index time, the modules indexed and rotated in the system by changing valves that directed the flow of the process streams. The module that was most upstream in the capture step was taken out of the series, and was then washed with wash buffer (10 mM Na-Phosphate, 0.9% NaCl, pH 7.4), then eluted with elution buffer (0.5 M acetic acid, pH 2.45), then re-equilibrated with equilibration buffer (100 mM Na-Phosphate, 150 mM NaCl, pH 7.2). These three steps of wash, elution, and re-equilibration occur in the recovery zone. At the same time, the module that has been regenerated was inserted at the most downstream position in the series, and the remaining modules in the capture series were shifted upstream one position.

When the system was started the stationary phase did not contain any IgG antibody. The antibody concentration in the liquid phase in each module was also zero. The modules were initially filled with wash buffer. The feed solution was introduced at a flow rate of about 40 mL/min and an antibody concentration of 0.96 mg/mL. The system was indexed three times. Cycle times were 15 min, 9 min, 9 min, and 11 min for cycles 1 through 4, respectively. At the end of the last cycle all of the cartridges in the series were washed with wash buffer, eluted with elution buffer (0.5 M acetic acid, pH 2.45), washed again with equilibration buffer (100 mM Sodium Phosphate, 150 mM NaCl, pH 7.2), then cleaned with a guanidine buffer (2M guanidine HCl, 10 mM TRIS (tris(hydroxymethyl)aminoethane), pH 7.5). Sample aliquots were taken from the effluent at intervals and thus reduced the volume of effluent stream. Concentrations were calculated from UV-Vis Spectrophotometer Absorbance at 280 nm.

Cartridge Position for Cycle 1:

Inlet-A-B-C-D-Outlet
Offline (E, F, G)
Cycle 1

| | Volume (mL) | Concentration of IgG (mg/mL) | IgG (mg) |
|---|---|---|---|
| Effluent | 581 | 0.02 | 12 |
| Module A Wash 1 | 595 | 0.174 | 104 |
| Module A Elution | 1026 | 0.161 | 165 |
| Feed Volume | 611 | mL | |
| Cycle Duration | 15 | min | |
| Average Flow Rate | 41 | mL/min | |
| Feed Concentration | 0.96 | Mg/mL | |
| Total Challenge | 586 | mg | |
| Total Eluted | 165 | mg | |
| Samples | 30 | mL | |

Cartridge Position for Cycle 2:

Inlet-B-C-D-E-Outlet
Offline (F, G, A)
Cycle 2

| | Volume (mL) | Concentration of IgG (mg/mL) | IgG (mg) |
|---|---|---|---|
| Effluent | 340 | 0.035 | 12 |
| Module B Wash 1 | 549 | NA | NA |
| Module B Elution | 481 | 0.336 | 162 |
| Feed Volume | 355 | ml | |
| Cycle Duration | 9 | min | |
| Average Flow Rate | 39 | ml/min | |
| Feed Concentration | 0.96 | mg/mL | |
| Total Challenge | 340 | mg | |
| Total Eluted | 162 | mg | |
| Samples | 15 | mL | |

Cartridge Position for Cycle 3:

Inlet-C-D-E-F-Outlet
Offline (G, A, B)
Cycle 3

| | Volume (mL) | Concentration of IgG (mg/mL) | IgG (mg) |
|---|---|---|---|
| Effluent | 234 | 0.041 | 10 |
| Module C Wash 1 | 526 | 0.085 | 45 |
| Module C Elution | 489 | 0.384 | 188 |
| Feed Volume | 249 | ml | |
| Cycle Duration | 9.3 | min | |
| Average Flow Rate | 27 | ml/min | |
| Feed Concentration | 0.96 | mg/mL | |
| Total Challenge | 238 | mg | |
| Total Eluted | 188 | mg | |
| Samples | 15 | mL | |

Cartridge Position for Cycle 4:

Inlet-D-E-F-G-Outlet
Offline (A, B, C)
Cycle 4

| | Volume (mL) | Concentration of IgG (mg/mL) | IgG (mg) |
|---|---|---|---|
| Effluent | 385 | 0.043 | 16 |
| Collective Wash 1 | 3885 | 0.051 | 196 |
| Module D elution | 499 | 0.338 | 168 |
| Module E elution | 485 | 0.322 | 156 |
| Module F elution | 497 | 0.216 | 108 |
| Module G elution | 483 | 0.173 | 83 |
| Collective Wash 2 | 2018 | NA | |
| Guanidine Wash | 1773 | 0.000 | 0 |
| Feed Volume | 400 | ml | |
| Cycle Duration | 11 | min | |
| Average Flow Rate | 36 | ml/min | |
| Feed Concentration | 0.96 | mg/mL | |
| Total Challenge | 383 | mg | |
| Total Eluted | 516 | mg | |
| Samples | 15 | mL | |

Samples were taken every minute from the last cartridge in the series. Effluent Sample Concentrations

| Elapsed Time (min) | Cycle | IgG (mg/mL) |
|---|---|---|
| 1 | 1 | 0.022 |
| 2 | 1 | 0.010 |
| 4 | 1 | 0.047 |
| 5 | 1 | 0.073 |
| 7 | 1 | 0.006 |
| 8 | 1 | 0.006 |
| 9 | 1 | 0.006 |
| 10 | 1 | 0.009 |
| 11 | 1 | 0.014 |
| 12 | 1 | 0.020 |
| 13 | 1 | 0.028 |
| 14 | 1 | 0.038 |
| 15 | 1 | 0.053 |
| 16 | 2 | 0.025 |
| 17 | 2 | 0.012 |
| 18 | 2 | 0.014 |
| 19 | 2 | 0.022 |
| 20 | 2 | 0.028 |
| 21 | 2 | 0.035 |
| 22 | 2 | 0.045 |
| 23 | 2 | 0.052 |
| 24 | 2 | 0.061 |
| 25 | 3 | 0.023 |
| 26 | 3 | 0.014 |
| 27 | 3 | 0.015 |
| 28 | 3 | 0.020 |
| 29 | 3 | 0.030 |
| 30 | 3 | 0.037 |
| 31 | 3 | 0.043 |
| 32 | 3 | 0.044 |
| 33 | 3 | 0.051 |
| 34 | 4 | 0.010 |
| 35 | 4 | 0.011 |
| 36 | 4 | 0.016 |
| 37 | 4 | 0.030 |
| 38 | 4 | 0.039 |
| 39 | 4 | 0.040 |
| 40 | 4 | 0.050 |
| 41 | 4 | 0.059 |
| 42 | 4 | 0.069 |

We claim:

1. A single pass method of continuously separating a target molecule from a solution mixture comprising steps of:
   providing a simulated moving bed apparatus comprising a plurality of filter cartridge modules, each filter cartridge module comprising a volume of stationary phase particulates adjacent a porous substrate layer and the volume of stationary phase particulates having a bed height of less than 1 centimeter, each filter cartridge module having a filter cartridge module inlet and a filter cartridge module outlet, the plurality of filter cartridge modules being in serial fluid connection;
   flowing a solution mixture comprising a target molecule continuously through the plurality of filter cartridge modules;
   binding the target molecule to the volume of stationary phase particulates to form a target molecule:stationary phase particulate product;
   removing a loaded filter cartridge module containing the target molecule:stationary phase particulate product from the solution mixture flow;
   separating the target molecule from the target molecule: stationary phase particulate product from the loaded filter cartridge to form an isolated target molecule product and a regenerated filter cartridge; and
   adding the regenerated filter cartridge module to the solution mixture flow.

2. A method according to claim 1, wherein the providing step comprises providing a simulated moving bed apparatus comprising a plurality of filter cartridge modules, each filter cartridge module comprising a volume of stationary phase particulates adjacent a porous substrate layer and the volume of stationary phase particulates having a bed height in a range from 0.04 to 0.10 centimeters.

3. A method according to claim 1, wherein the providing step comprises providing a simulated moving bed apparatus comprising a plurality of filter cartridge modules, each filter cartridge module comprising a volume of stationary phase particulates adjacent a porous substrate layer and the volume of stationary phase particulates having a mean diameter in a range from 5 to 30 micrometers.

4. A method according to claim 3, wherein the flowing step comprises flowing a solution mixture comprising a target molecule continuously through the plurality of filter cartridge modules, wherein the solution mixture flows through each filter cartridge at a rate of at least 5 liters/minute per liter of stationary phase particulates in each filter cartridge module and each filter cartridge has a pressure drop from the filter cartridge module inlet to the filter cartridge module outlet of 69 kPa (10 psi) or less.

5. A method according to claim 3, wherein the flowing step comprises flowing a solution mixture comprising a target molecule continuously through the plurality of filter cartridge modules, wherein the solution mixture flows through each filter cartridge at a rate of at least 3 liters/minute per liter of stationary phase particulates in each filter cartridge module and each filter cartridge has a pressure drop from the filter cartridge module inlet to the filter cartridge module outlet of 34 kPa (5 psi) or less.

6. A method according to claim 1, wherein the flowing step comprises flowing a solution mixture comprising a target molecule wherein the target molecule comprises a biomacromolecule.

7. A method according to claim 1, wherein the flowing step comprises flowing a solution mixture comprising a target molecule wherein the target molecule comprises a protein.

8. A method according to claim 1, wherein the removing step and the adding step occur at the same time.

9. A method according to claim 1, wherein the removing step, the flowing step and the adding step occur at the same time.

10. A method according to claim 1, wherein the separating step, and the binding step occur at the same time.

11. A method according to claim 1, wherein the removing step, the separating step, the flowing step, the binding step, and the adding step occur at the same time.

12. A method according to claim 1, wherein the removing step comprises removing a loaded filter cartridge module containing a first concentration of target molecule per milliliter of stationary phase particulate and wherein the adding step comprises adding the regenerated filter cartridge module containing a second concentration of target molecule per milliliter of stationary phase particulate, and the first concentration of target molecule per milliliter of stationary phase particulate being greater than the second concentration of target molecule per milliliter of stationary phase particulate.

13. A method according to claim 1, wherein the flowing step comprises flowing a solution mixture comprising a target molecule continuously through the plurality of filter cartridge modules and a feed flow rate and a filter cartridge module flow rate is substantially identical.

* * * * *

UNITED STATES PATENT AND TRADEMARK OFFICE
CERTIFICATE OF CORRECTION

| | | |
|---|---|---|
| PATENT NO. | : 7,413,660 B2 | Page 1 of 1 |
| APPLICATION NO. | : 11/241524 | |
| DATED | : August 19, 2008 | |
| INVENTOR(S) | : Kelly J. Gibbens | |

It is certified that error appears in the above-identified patent and that said Letters Patent is hereby corrected as shown below:

<u>Column 12</u>

Line 27; after "the series." delete "Effluent Sample Concentrations" and insert the same on Column 12, Line 28, as a sub-heading of the table.

Signed and Sealed this

Sixteenth Day of February, 2010

David J. Kappos
*Director of the United States Patent and Trademark Office*